US005651585A

United States Patent [19]
Van Duser

[11] Patent Number: 5,651,585
[45] Date of Patent: Jul. 29, 1997

[54] KNEE ACTION SUSPENSION SEAT

[75] Inventor: Harold Van Duser, Reedsburg, Wis.

[73] Assignee: Seats, Inc., Reedsburg, Wis.

[21] Appl. No.: 202,106

[22] Filed: Feb. 25, 1994

[51] Int. Cl.$^6$ ................................................. B60N 2/50
[52] U.S. Cl. ........................... 297/344.16; 297/344.15; 248/585
[58] Field of Search ................. 297/344.15, 344.16, 297/325, 328; 248/585, 586, 588

[56] References Cited

U.S. PATENT DOCUMENTS

| | | | |
|---|---|---|---|
| 2,527,905 | 10/1950 | Barecki | 297/344.15 X |
| 2,652,880 | 9/1953 | Gundersen | 155/51 |
| 2,840,140 | 6/1958 | Harrington | 155/51 |
| 2,894,562 | 7/1959 | Peller | 155/51 |
| 3,285,562 | 11/1966 | Langer | 248/585 X |
| 3,298,654 | 1/1967 | Dome | 248/585 X |
| 3,314,672 | 4/1967 | Persson | 248/585 X |
| 3,519,241 | 7/1970 | Tschursch | 248/399 |
| 3,711,149 | 1/1973 | Carter | 296/63 |
| 3,727,974 | 4/1973 | Swenson et al. | 248/585 X |
| 3,761,045 | 9/1973 | Sturhan | 248/399 |
| 3,788,697 | 1/1974 | Barton et al. | 297/307 |
| 3,879,007 | 4/1975 | Barton et al. | 248/400 |
| 3,913,975 | 10/1975 | Carter | 297/307 |
| 3,984,078 | 10/1976 | Sturhan | 248/399 |
| 3,986,748 | 10/1976 | Magnuson | 296/65 |
| 3,999,800 | 12/1976 | Penzotti . | |
| 4,034,948 | 7/1977 | Brownell | 248/585 |
| 4,125,242 | 11/1978 | Meiller et al. | 248/399 |
| 4,153,295 | 5/1979 | Boulanger et al. | 297/307 |
| 4,181,355 | 1/1980 | Grass et al. | 297/307 |
| 4,322,052 | 3/1982 | Hodge et al. | 248/420 |
| 4,351,556 | 9/1982 | Worringer | 296/63 |
| 4,494,794 | 1/1985 | Barley | 297/307 |
| 4,505,513 | 3/1985 | Barley | 297/307 |
| 4,678,155 | 7/1987 | Carter | 248/564 |
| 4,702,454 | 10/1987 | Izumida | 248/585 |
| 4,786,024 | 11/1988 | Goetz | 248/422 |
| 4,813,645 | 3/1989 | Iwami | 248/588 |
| 4,828,216 | 5/1989 | Van Duser | 248/585 |
| 4,884,841 | 12/1989 | Holley | 297/344.16 X |
| 4,949,930 | 8/1990 | Van Duser | 248/421 |
| 4,979,716 | 12/1990 | Holdampf | 248/393 |
| 5,004,206 | 4/1991 | Anderson | 248/585 |
| 5,005,894 | 4/1991 | Nagata | 296/68.1 |
| 5,076,528 | 12/1991 | Van Duser | 248/419 |

FOREIGN PATENT DOCUMENTS

| | | | |
|---|---|---|---|
| 910582 | 1/1946 | France | 248/586 |
| 658064 | of 0000 | United Kingdom . | |
| 930903 | 5/1962 | United Kingdom . | |
| 1156941 | 6/1966 | United Kingdom . | |
| 2029208 | 3/1980 | United Kingdom | 248/585 |
| 2118031 | 10/1983 | United Kingdom | 297/344.15 |

*Primary Examiner*—Peter M. Cuomo
*Assistant Examiner*—David E. Allred
*Attorney, Agent, or Firm*—Michael, Best & Friedrich

[57] ABSTRACT

A seat including a base; a housing vertically movable relative to the base; a pivot arm assembly pivotally movable relative to the housing between upwardly and downwardly pivoted positions; a seat cushion bracket movable relative to the housing in response to pivotal movement of the pivot arm assembly; and an air spring having a lower end fixed relative to the housing for movement therewith relative to the base, and the air spring having an upper end connected to the pivot arm assembly to bias the pivot arm assembly toward the upwardly pivoted position.

8 Claims, 4 Drawing Sheets

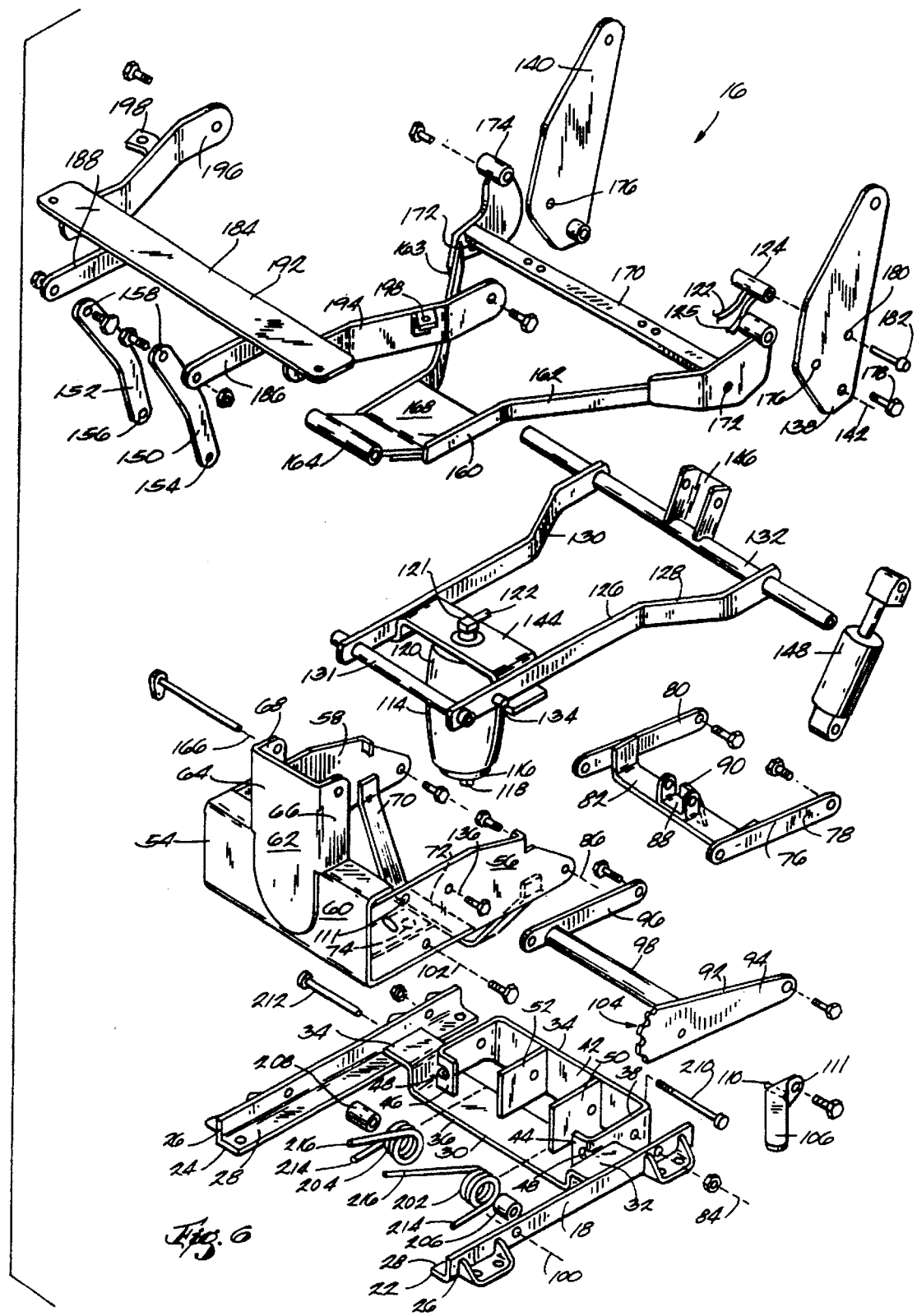

5,651,585

KNEE ACTION SUSPENSION SEAT

BACKGROUND OF THE INVENTION

1. Field of the Invention

The invention relates to seats which include vibration compensating suspension mechanisms. More particularly, the invention relates to a seat including an improved knee action suspension mechanism.

2. Reference to Prior Art

Seats of vehicles such as trucks are subject to substantial vibration as the vehicles travel over rough road surfaces. A majority of seats now made for operators of such vehicles include a vibration compensating suspension mechanism beneath the seat. Such suspension mechanism are in addition to the vehicle suspension systems which interpose the wheels of the vehicle and the vehicle bodies.

One type of suspension mechanism is the knee action suspension mechanism of the general type disclosed in U.S. Pat. No. 3,711,149. An improved type of knee action suspension mechanism is the floating knee pivot suspension mechanism disclosed in U.S. Pat. No. 4,949,930. For the knee action suspension mechanism disclosed in U.S. Pat. No. 4,949,930, it is required to operate a lever mounted on the chassis housing and an air valve connected to the air spring, thereby occupying both hands, in order to adjust the height of the seat cushion relative to the base. Also, when the height of the seat is changed, the air spring must be readjusted in order to control the ride, i.e., the upward bias of the pivot arm assembly, provided by the air spring.

SUMMARY OF THE INVENTION

The invention provides a knee action suspension mechanism wherein the height of the chassis housing, and thus the seat cushion, relative to the base can be adjusted by operating a single lever with one hand.

The invention also provides a knee action suspension mechanism wherein the amount of air in the air spring does not have to be changed to attain a desired ride when the height of the chassis housing, and thus the seat cushion, relative to the base are changed.

The invention also provides a knee action suspension mechanism wherein the amount of air in the air spring can be adjusted to provide a desired ride, i.e., a desired degree of upward bias of the lower pivot arm assembly, independently of the height of the housing and the seat cushion relative to the base.

More particularly, the invention provides a seat including a base and a housing vertically movable relative to the base. A a pivot arm assembly is pivotally movable relative to the housing between upwardly and downwardly pivoted positions. A seat cushion bracket is movable relative to the housing in response to pivotal movement of the pivot arm assembly. An air spring has a lower end fixed relative to the housing for movement therewith relative to the base, and the air spring has an upper end connected to the pivot arm assembly to bias the pivot arm assembly toward the upwardly pivoted position.

The invention also provides a seat including an air spring having an upper end connected to the pivot arm assembly to bias the pivot arm assembly toward the upwardly pivoted position, and means separate from the air spring for moving the housing upwardly relative to the base.

The invention also provides a seat including a housing supported relative to the base such that the housing is vertically movable relative to the base, and means for releasably locking the housing in a plurality of static vertical positions relative to the base. The housing is supported relative to the base such that the housing moves upwardly relative to the base when the locking means is released.

Other features and advantages of the invention will become apparent to those skilled in the art upon review of the following detailed description, claims and drawings.

BRIEF DESCRIPTION OF THE DRAWINGS

FIG. 3 is a front view taken generally along line 3—3 in FIG. 2.

FIG. 6 is an exploded view of the suspension mechanism shown in FIGS. 2–5.

Figure 1:
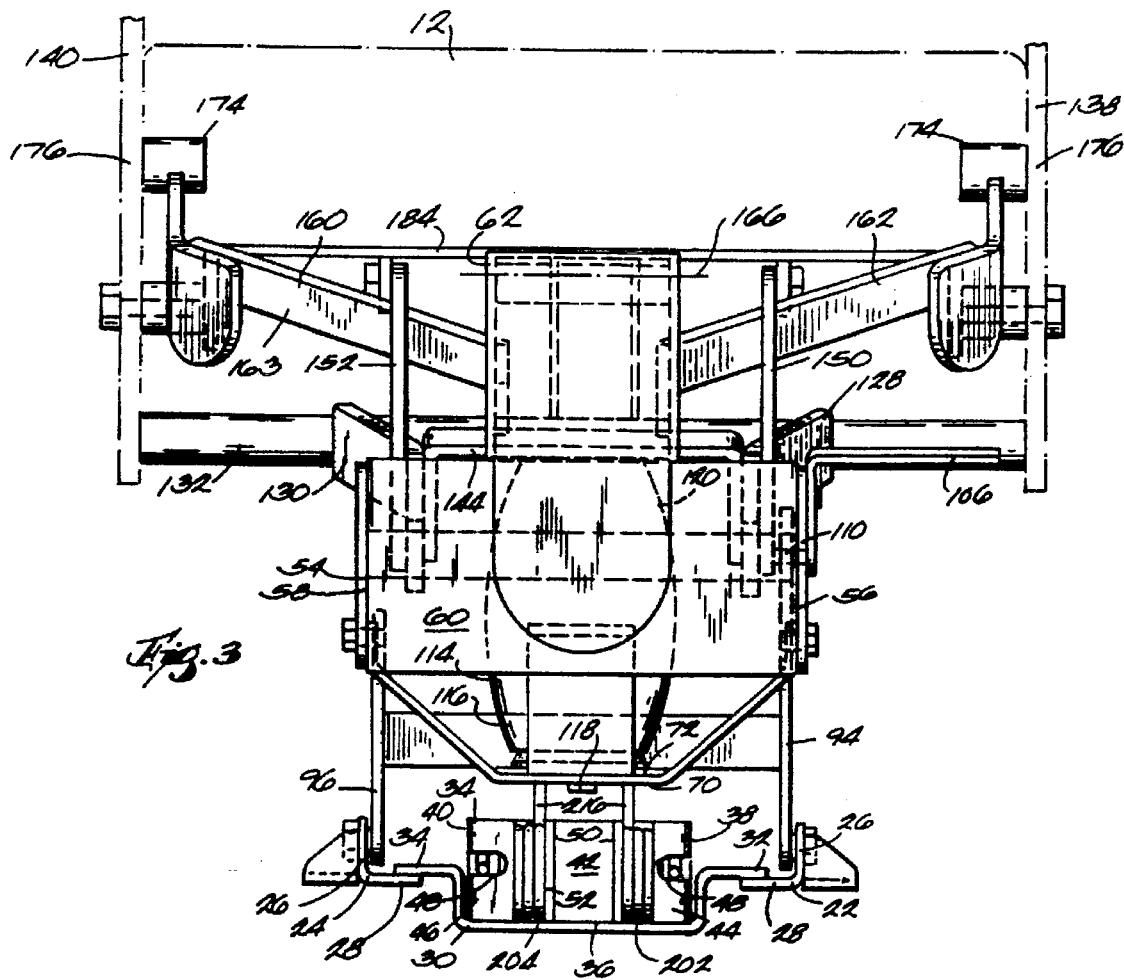
FIG. 1 is a perspective view of a seat embodying the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF A PREFERRED EMBODIMENT

Illustrated in FIG. 1 is a vehicle seat 10 embodying the invention. Except as otherwise described herein, the seat 10 is identical to the seat disclosed in U.S. Pat. No. 4,949,930, which is assigned to the assignee hereof and which is incorporated herein by reference.

The seat 10 includes a seat cushion 12 and a back cushion 14. The cushions 12 and 14 are mounted on a suspension mechanism 16. The suspension mechanism 16 is mounted on a base 18. The base 18 is mounted on a sliding mechanism 20 which is in turn mounted on a vehicle body (not shown). The sliding mechanism permits selective forward and backward static positioning of the suspension mechanism 16 relative to the vehicle body.

The base 18 includes a pair of elongated mounting brackets 22 and 24. The mounting brackets 22 and 24 are mirror images of each other. Each mounting bracket 22, 24 has a generally L-shaped cross section and includes a vertical outer wall 26. Each mounting bracket 22, 24 also has a horizontal bottom wall 28 extending at a 90° angle from the outer wall 26. The bottom wall 28 is connected to the sliding mechanism. The base 18 also includes a tie bar 30 extending between the mounting brackets 22 and 24. The tie bar 30 has opposed end portions 32 and 34 respectively connected to the brackets 22 and 24. The tie bar has a downwardly offset central portion 36. The base 18 also includes a spring mounting bracket 34 mounted on the tie bar central portion 36. The spring mounting bracket 34 includes opposed vertical side walls 38 and 40 connected by a vertical back wall 42. The forward ends of the side walls 38 and 40 have thereon respective inwardly extending flanges 44 and 46. Each flange 44, 46 has therein an aperture 48. A pair of spaced, vertical intermediate walls 50 and 52 extend from the back wall 42. The intermediate walls 50 and 52 are parallel to the side walls 38.

The suspension mechanism 16 includes a chassis housing 54 which is supported relative to the base 18 such that the housing 54 is vertically movable relative to the base. The housing 54 includes upright, parallel side plates 56 and 58, ioined by an upright face plate 60. The plates 56 and 58 are welded metal plates. A stanchion 62 is welded to the face plate 60 and extends upwardly therefrom. The stanchion 62 has a "C" shape in horizontal cross section and includes a front wall 64 and spaced side walls 66 and 68 extending rearwardly from the front wall 64. A T-shaped air spring mounting bracket 70 extends between the housing side plates 56 and 58 and rearwardly from the face plate 60. The bracket 70 has an upper surface 72 and has therein aperture 74.

The seat also includes a height adjustment bracket 76. The height adjustment bracket 76 is a generally H-shaped member including a pair of opposed arms 78 and 80 connected by a reactance member 82. The lower end of the arm 78 is connected to the mounting bracket 22 for pivotal movement about a horizontal axis 84. The lower end of the arm 80 is connected to the mounting bracket 24 for pivotal movement about the same horizontal axis 84. The upper end of the arm 78 is connected to the housing 54 for pivotal movement about a horizontal axis 86. The upper end of the arm 80 is connected to the housing 54 for pivotal movement about the same horizontal axis 86. A lower shock bracket 88 is mounted on the reactance member 82. A spring retainer bracket 90 is mounted on the reactance member 82 adjacent the lower shock bracket 88.

The seat also includes a segmented link assembly 92. The link 92 is a generally H-shaped member having a segmented link 94 and an opposed riser link 96 connected by a cross member 98. The lower end of the link 94 is connected to the mounting bracket 22 for pivotal movement about a horizontal axis 100. The lower end of the link 96 is connected to the mounting bracket 24 for pivotal movement about the same horizontal axis 100. The upper end of the link 94 is connected to the side plate 56 of the housing 54 for pivotal movement about a horizontal axis 102. The upper end of the link 96 is connected to the side plate 58 of the housing 54 for pivotal movement about the same horizontal axis 102. The segmented link assembly 92 and the height adjustment bracket 76 cooperate to from a parallelogram arrangement for moving the housing 54 relative to the base 18 while maintaining the horizontal orientation of the housing 54. The upper end of the link 94 has therein a plurality of recesses or notches 104. As seen by comparison of FIGS. 2 and 4, the link 94 is movable relative to the housing 54 between a plurality of link positions corresponding to static vertical positions of the housing 20 relative to the base 18.

The seat also comprises means for releasably locking the link 94 relative to the housing 54 to establish a static vertical position of the housing 54 relative to the base 18. In the illustrated embodiment, the locking means includes a lever 106 connected to the side plate 56 of the housing 54 for pivotal movement about a horizontal axis 108. The lever 106 includes a pin 110. The pin 110 extends inwardly through a slot 112 in the side plate 56. The lever 106 is selectively pivotable about a horizontal pivot axis 111 to move the pin 110 into and out of the notches 104. When the pin 110 is received in a notch 104, the link 94 is locked relative to the housing 54 and establishes a static vertical position of the housing 54 relative to the base 18. The link 94 is movable relative to the housing 54 between a plurality of link positions corresponding to different static vertical positions of the housing 54 relative to the base 18, and the lever 106 is operable for the pin 110 to selectively and releasably lock the link 94 relative to the housing in any one of the link positions.

The suspension mechanism also comprises an air spring 114. The air spring 114 has a lower end 116 mounted on the air spring mounting bracket upper surface 72. A pin 118 extends into the aperture 74 to retain the air spring 114 against the air spring mounting bracket 70. The air spring 114 has an upper end 120 having thereon an air fitting 30 to which an air supply hose 122 is connected. The air supply hose is connected at its other end to an air valve 124. An air supply hose 125 is connected to the air valve 124 to supply air through the valve 124 to the air spring 114. The valve 124 is selectively operable to let air into and out of the air spring 114.

The suspension mechanism also includes a lower pivot arm assembly 126 which is pivotally movable relative to the housing 54 between upwardly and downwardly pivoted positions. The lower pivot arm assembly 126 includes two mirror-image arms 128 and 130 formed of plate material and extending from a forward pivot arm tube 131 to a rear pivot arm tube 132. Each of the arms 128 and 130 includes a lower pivot link pin 134 extending outwardly therefrom. The forward pivot tube 131 extends between and is mounted on the side plates 56 and 58 of the housing 54 for pivotal movement relative to the housing 54 about a horizontal axis 136. The rear pivot arm tube 132 is mounted to a pair of back cushion frame arm brackets 138 and 140 for pivotal movement about a horizontal axis 142. An upper air spring mounting bracket 144 extends between the arms 128 and 130. The upper end of the air spring 114 is connected to the bracket 144 to bias the lower pivot arm assembly 126 toward the upwardly pivoted position (counterclockwise in FIG. 4). The rear pivot arm tube 132 includes an upper shock absorber mounting bracket 146. A shock absorber 148 is connected between the upper shock absorber mounting bracket 146 and the lower shock bracket 88. The shock absorber 148 is operable to support the rear portion of the lower pivot arm assembly 126 relative to the lower shock bracket 88.

The suspension mechanism 16 also includes a pair of identical pivot links 150 and 152. Each pivot link is an elongated, slightly curved member having opposed upper and lower ends. The lower end of the link 150 has therein a pivot aperture 154 receiving the pivot pin 134 of the arm 128, and the lower end of the link 152 has therein a pivot aperture 156 receiving the pivot pin 134 of the arm 130. The upper end of each link 150, 152 has therein a pivot aperture 158.

The suspension mechanism 16 also includes an upper pivot arm assembly 160. The upper pivot arm assembly includes mirror-image arms 162 and 163 extending rearwardly from a forward pivot arm pivot tube 164. The pivot tube 164 extends between the stanchion side walls 66 and 68 and is connected to the stanchion for pivotal movement about a horizontal axis 166. A reinforcing plate 168 joins the arms 162 and 163 and the pivot tube 164. The arms 162 and 163 are connected by a tie bar 170. The rear portion of each arm 162 and 163 has therein a respective pivot aperture 172. The rear portion of each arm 162 and 163 also has mounted thereon a respective pivot bushing 174.

The back cushion 12 is mounted on the arm brackets 138 and 140. Each of the arm brackets 138 and 140 has therein a respective pivot aperture 176. A pivot member such as a pivot pin 178 extends through the pivot aperture 176 and is received in the adjacent bushing 174 on the rear portion of the upper pivot arm assembly 160. The right arm bracket 140 also includes an air valve aperture 180. The air valve 124 is mounted on the arm bracket 140 and a push pull knob 182 extends through the aperture 180 for operating the valve 124.

The suspension mechanism 16 also includes a seat cushion mounting bracket 184. The cushion mounting bracket 184 includes a pair of mirror-image front arms 186 and 188. The forward ends of the arms 186 and 188 are respectively connected to the upper ends of the pivot links 150 and 152 for pivotal movement about a horizontal axis 190. The rear ends of the arms 186 and 188 and connected by a cross member 192. The bracket 184 also includes a pair of mirror-image rear arms 194 and 196 extending rearwardly from the cross member 192. Each arm 194, 196 has thereon a respective mounting bracket 198 to which the seat cushion 12 is mounted. The rear end of the arm 194 is connected to the arm 162 by a pin 200 extending through the pivot aperture 172 in the arm 162. The rear end of the arm 196 is connected to the arm 26 by a pin 200 extending through the pivot aperture 172 in the arm 163.

Figure 2:
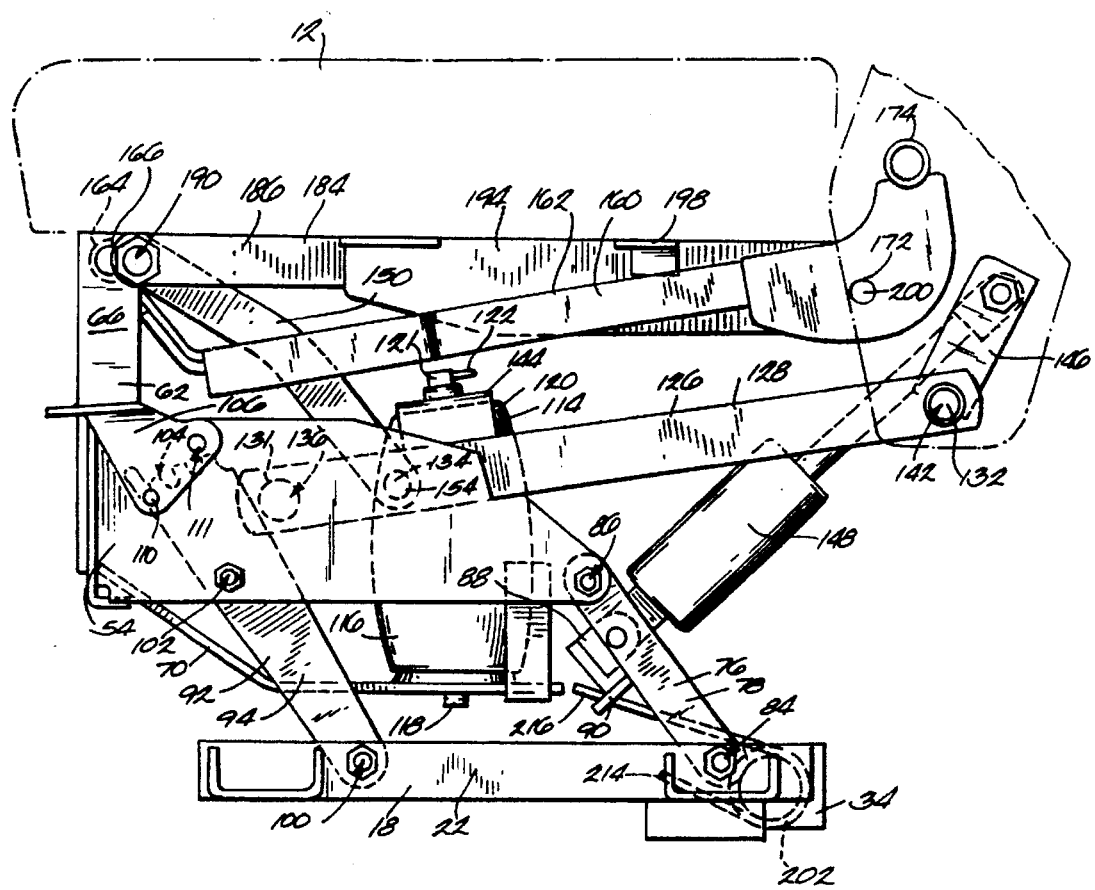
FIG. 2 is a side elevational view, showing the suspension mechanism in the upwardly pivoted position with the housing in a raised position relative to the base.
Figure 5:
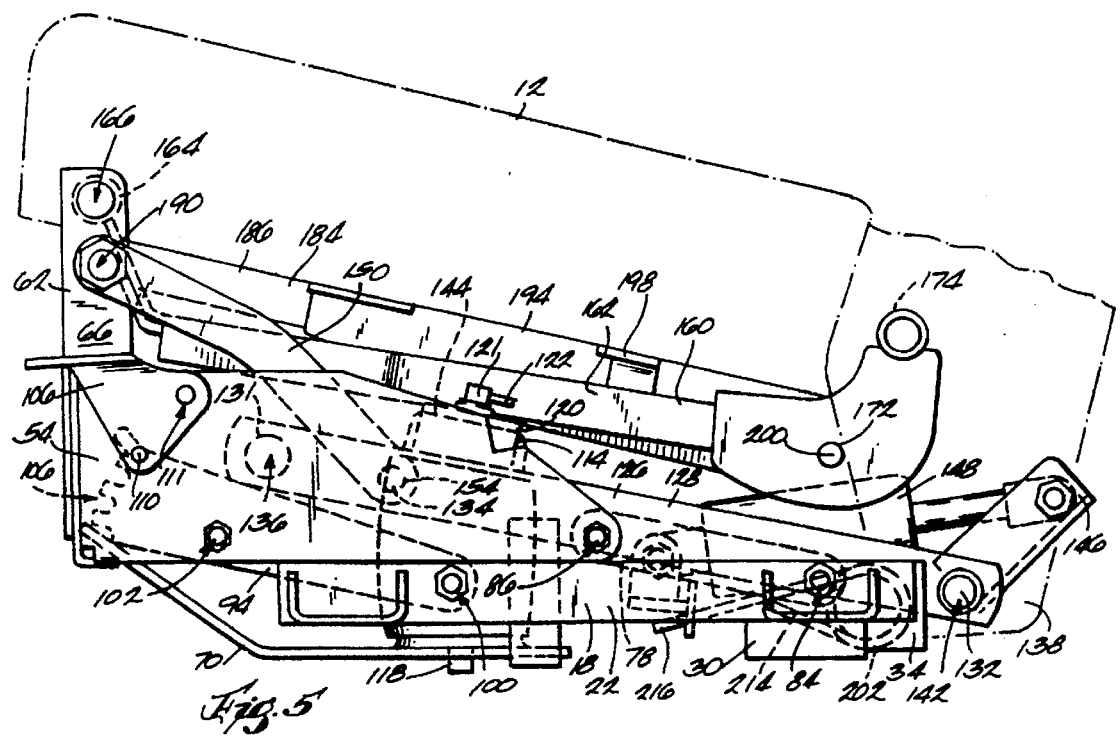
FIG. 5 is a view similar to FIG. 4, showing the suspension mechanism in the downwardly pivoted position with the housing in a low position relative to the base.
Figure 4:
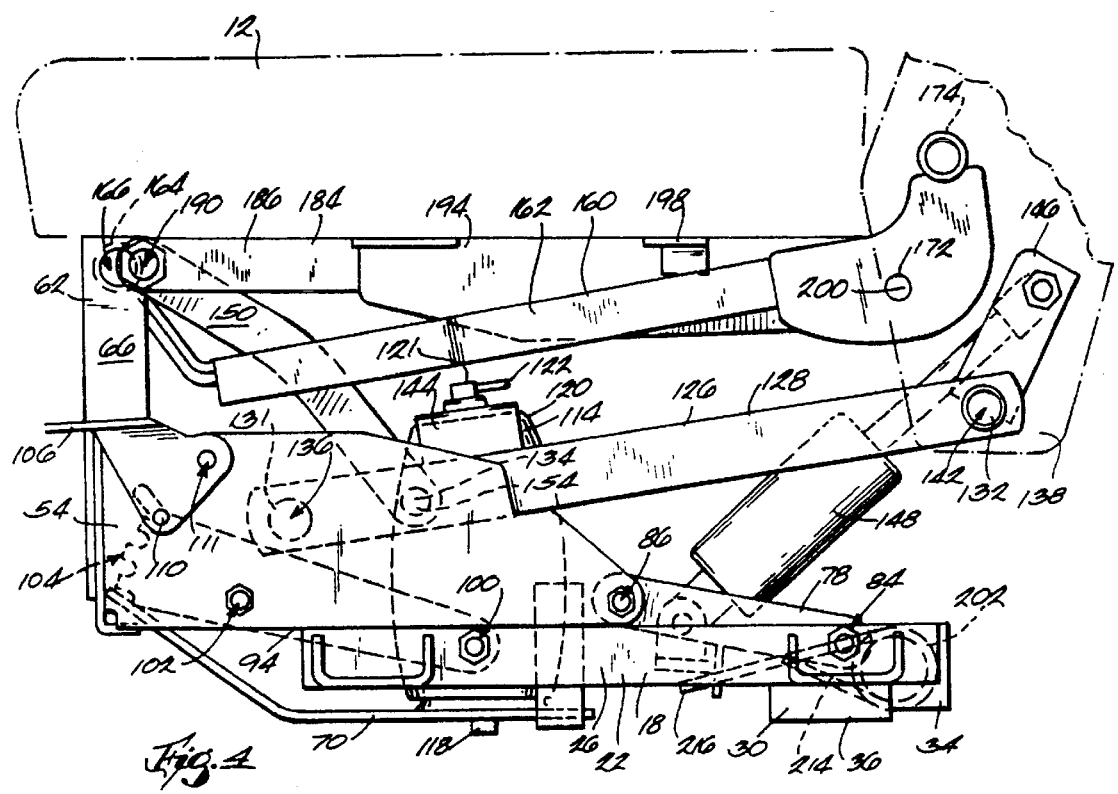
FIG. 4 is a view similar to FIG. 2, showing the suspension mechanism in the upwardly pivoted position with the housing in a low position relative to the base.

Referring to FIGS. 2, 4 and 5, when the lower pivot arm assembly 126 pivots clockwise relative to the housing 54, the arm brackets 138 and 140 move downwardly, the upper pivot arm assembly 160 pivots clockwise, the forward end of the cushion mounting bracket 184 moves slightly downward due to the connection to the links 150 and 152 (which move downward with the lower pivot arm assembly 126), and the rear end of the bracket 184 moves downward with the rear ends of the arms 162 and 26. Thus, the seat cushion bracket 184 is movable relative to the housing 54 in response to pivotal movement of the lower pivot arm assembly 126.

The suspension mechanism 16 also includes means separate from the air spring 114 for moving the housing 54 upwardly relative to the base 18. In the illustrated embodiment, the housing moving means includes a pair of torsion springs 202 and 204. The springs 202 and 204 are mounted on respective bushings 206 and 208. The bushing 206 is mounted in the spring mounting bracket 34 on a mounting member 210 extending between the side wall 38 and the intermediate wall 50. The bushing 208 is mounted in the spring mounting bracket 34 on a mounting member 212 extending between the side wall 40 and the intermediate wall 52. Each spring has an anchor end 214 which is received in the aperture 48 in the corresponding flange 44 or 46. Each spring has an elongated end 216 which is received in the spring retainer bracket 90 on the height adjustment bracket 76 and is operable to bias the height adjustment bracket 76 upwardly. Thus, when the lever 106 is operated to unlock the link 94 relative to the housing 54, the housing 54 moves upwardly relative to the base 18.

In operation, the lever 106 is operable to adjust the height of the seat cushion 218 relative to the base 18. When the lever is operated to release the link 94 relative to the housing 54, the torsion springs 202 and 204 acting on the height adjustment bracket 76 cause the housing 54 to move upwardly relative to the base 18. This adjustment is accomplished with a single hand operating the lever 106. Since the air spring 114 is mounted on the housing 54, the amount of air in the air spring 114 does not have to be changed to attain a desired ride when the height of the seat cushion 218 relative to the base 18 is changed. The amount of air in the air spring 114 can be adjusted to provide a desired ride, i.e., a desired degree of upward bias of the lower pivot arm assembly, independently of the height of the housing 54 and seat cushion 218 relative to the base 18.

What is claimed is:

1. A seat comprising:

a base;

a height adjustment bracket pivotally movable relative to said base;

a housing vertically movable relative to said base and pivotally movable relative to said height adjustment bracket;

a pivot arm assembly pivotally movable relative to said housing between upwardly and downwardly pivoted positions;

a seat cushion bracket movable relative to said housing in response to pivotal movement of said pivot arm assembly;

an air spring having a lower end fixed relative to said housing for movement therewith relative to said base, and said air spring having an upper end connected to said pivot arm assembly to bias said pivot arm assembly toward the upwardly pivoted position; and means for moving said housing upwardly relative to said base, said means for moving said housing including a spring which is operable to move said height adjustment bracket relative to said base.

2. A seat comprising:

a base;

a housing vertically movable relative to said base;

a pivot arm assembly pivotally movable relative to said housing between upwardly and downwardly pivoted positions;

a seat cushion bracket movable relative to said housing in response to pivotal movement of said pivot arm assembly;

an air spring having a lower end fixed relative to said housing for movement therewith relative to said base, and said air spring having an upper end connected to said pivot arm assembly to bias said pivot arm assembly toward the upwardly pivoted position;

a link pivotally movable relative to said base and relative to said housing; and means for releasably locking said link relative to said housing to establish a static vertical position of said housing relative to said base, said means for releasably locking said link relative to said housing including a lever pivotally mounted on said housing.

3. A seat comprising:

a base;

a housing vertically movable relative to said base;

a pivot arm assembly pivotally movable relative to and connecting said housing and said base for movement between upwardly and downwardly pivoted positions;

a seat cushion bracket movable relative to said housing in response to pivotal movement of said pivot arm assembly;

an air spring having an upper end connected to said pivot arm assembly to bias said pivot arm assembly toward the upwardly pivoted position;

means separate from said air spring for moving said housing upwardly relative to said base;

said means for moving including a link of said arm assembly pivotally movable relative to said base and relative to said housing; and means for releasably locking said link relative to said housing to establish a static vertical position of said housing relative to said base.

4. The seat as set forth in claim 3 and wherein said housing can be established in a plurality of static vertical positions relative to said base, wherein said link is movable relative to said housing between a plurality of link positions corresponding to said static vertical positions of said housing, and wherein said locking means selectively and releasably locks said link relative to said housing in any one of said link positions.

5. The seat forth in claim 3 and wherein said means for releasably locking said link relative to said housing includes a lever pivotally mounted on said housing.

6. A seat comprising:

a base;

a height adjustment bracket pivotally movable relative to said base;

a housing supported relative to said base such that said housing is vertically movable relative to said base and is pivotally movable relative to said height adjustment bracket;

a pivot arm assembly pivotally movable relative to said housing between upwardly and downwardly pivoted positions;

a seat cushion bracket movable relative to said housing in response to pivotal movement of said pivot arm assembly;

means for releasably locking said housing in a plurality of static vertical positions relative to said base;

said housing being supported relative to said base such that said housing moves upwardly relative to said base when said locking means is released; and a spring which is operable to move said height adjustment bracket relative to said base for moving said housing upwardly relative to said base when said locking means is released.

7. A seat comprising:

a base;

a housing supported relative to said base such that said housing is vertically movable relative to said base;

a pivot arm assembly pivotally movable relative to said housing between upwardly and downwardly pivoted positions;

a seat cushion bracket movable relative to said housing in response to pivotal movement of said pivot arm assembly;

a link pivotally movable relative to said base and relative to said housing;

means for releasably locking said housing in a plurality of static vertical positions relative to said base, said means for releasably locking said housing including means for releasably locking said link relative to said housing, said means for releasably locking said link relative to said housing including a lever pivotally mounted on said housing; and said housing being supported relative to said base such that said housing moves upwardly relative to said base when said means for releasably locking said housing is released.

8. The seat as set forth in claim 6 and wherein said seat further comprises an air spring having a lower end fixed relative to said housing for movement therewith relative to said base, and said air spring having an upper end connected to said pivot arm assembly to bias said pivot arm assembly toward the upwardly pivoted position.

* * * * *